UNITED STATES PATENT OFFICE.

FRANK J. TONE, OF NIAGARA FALLS, NEW YORK.

COMPOSITION OF MATTER FOR GENERATING HEAT.

939,570.  Specification of Letters Patent.  Patented Nov. 9, 1909.

No Drawing.  Application filed December 29, 1906. Serial No. 350,042.

*To all whom it may concern:*

Be it known that I, FRANK J. TONE, of Niagara Falls, Niagara county, New York, have invented a new and useful Composition of Matter for Generating Heat, of which the following is a description.

My invention relates to a new composition of matter for the generation of heat, and is designed to provide a composition of this character containing elements and compounds possessing extremely high heats of combustion, and capable of being used for the reduction of metals and other purposes.

In the well known alumino-thermic process for the welding of metals and similar uses, a material commercially named "thermit", and consisting substantially of a mixture of finely divided aluminum and ferric oxid, is employed. The reaction between the metal and oxid results in the reduction of the iron oxid and the oxidation of the aluminum. The heat generated by this reaction is very great and has found useful application in a number of ways. The temperature generated by these reactions and the efficiency of these mixtures for heating purposes is directly proportional to the net total number of heat units developed and inversely proportional to the mass of the mixture. If the total heat developed is large and the mass of the mixture at the same time is small, the energy density through the mass and hence the degree of temperature will be high. On the other hand, great heat cannot be generated if the mass of mixture per unit of oxygen or per unit of the element to be oxidized is large; nor likewise if the heat of combustion of the element to be oxidized is not greatly in excess of the heat of formation of the oxygen compound to be reduced.

In order to compute the net number of heat units generated by the reaction of a mixture of silicon and ferric oxid made up, using molecular equivalents of the two substances according to the following equation:

(1) 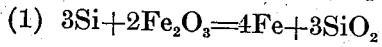 $3Si + 2Fe_2O_3 = 4Fe + 3SiO_2$ there must be deducted from the heat of formation of $SiO_2$ the heat required to raise the mass to the temperature of reaction, the heat of fusion of the substances, and the heat required to dissociate the ferric oxid. It will be seen, therefore, that if it were possible to substitute for the ferric oxid, an oxygen compound having less mass per unit of oxygen and less heat of formation per unit of mass, there would be a gain in the energy density of the mixture. Among the substances which answer this requirement may be mentioned—potassium permanganate, potassium chlorate, barium peroxid, sodium peroxid and other compounds which I call "highly oxidized unstable oxygen compounds", and which give up oxygen either with little absorption of heat, or with an evolution of heat. It is found, however, that when a mixture is made, for instance of silicon and potassium chlorate, according to the following equation:

(2)  $3Si + 2KClO_3 = 3SiO_2 + 2KCl$ the reaction is so violent as to be almost explosive in character and one which can not be made use of in practical work.

I have discovered that by replacing only a part of the ferric oxid with a "highly oxidized" oxygen compound, there is no explosion or tendency of the mixture to be thrown out of the containing vessel, and that the energy density of the mass is greatly increased. In practice I have found that by taking one part of a mixture of silicon and potassium chlorate made up in accordance with equation (2) and three parts of a mixture of silicon and ferric oxid made up in accordance with equation (1), I get very satisfactory results. The reaction, after being initiated, proceeds without violence, and the heat generated is more intense. I do not confine myself, however, to the proportions above stated. In a like manner, I may replace a portion of the more stable iron oxid by potassium permanganate and greatly increase the energy density and the efficiency of heating. The method may likewise be applied to processes using in place of silicon alone, silicon alloys, silicids, or mixtures of silicon with other elements or compounds which, upon combination with oxygen, have excessively high heats of combustion.

The advantages of my invention result from the increased heat evolved in connection with the reduction in mass. Explosive action is avoided, and the action is simple and efficient.

I claim:—

1. As a new composition of matter, a mixture of finely-divided metal-containing substance, a normal oxygen compound of an element having less affinity for oxygen than is possessed by the metal, and a highly oxidized unstable oxygen compound.

2. As a new composition of matter, a mixture of finely divided silicon-containing substance, a normal oxygen compound of an element having less affinity for oxygen than is possessed by the silicon, and a highly oxidized unstable oxygen compound.

3. As a new composition of matter, a mixture of finely divided silicon, a normal oxygen compound of an element having less affinity for oxygen than is possessed by the silicon, and a highly oxidized unstable oxygen compound.

4. As a new composition of matter, a mixture of finely divided metal-containing substance, a normal oxygen compound of an element having less affinity for oxygen than is possessed by the metal of said substance, and potassium permanganate.

5. As a new composition of matter, a mixture of finely divided silicon, a normal oxygen compound of an element having less affinity for oxygen than is possessed by the silicon, and potassium permanganate.

6. As a new composition of matter, a mixture of finely divided silicon, ferric oxid, and a highly oxidized unstable oxygen compound.

7. As a new composition of matter, a mixture of finely divided silicon-containing substance, a ferric oxid, and potassium permanganate.

In testimony whereof, I have hereunto set my hand.

FRANK J. TONE.

Witnesses:
FRED I. PIERCE,
CHARLES CHORMANN.